United States Patent
Cho et al.

(10) Patent No.: US 11,483,585 B2
(45) Date of Patent: Oct. 25, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Daesung Cho, Suwon-si (KR); Wonjae Lee, Hwaseong-si (KR); Insang Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 282 days.

(21) Appl. No.: 16/928,691

(22) Filed: Jul. 14, 2020

(65) Prior Publication Data

US 2021/0076066 A1   Mar. 11, 2021

(30) Foreign Application Priority Data

Sep. 11, 2019   (KR) .................. 10-2019-0113070

(51) Int. Cl.
*H04N 19/59*   (2014.01)
*H04N 19/124*   (2014.01)
(Continued)

(52) U.S. Cl.
CPC ........... *H04N 19/59* (2014.11); *G06T 3/4007* (2013.01); *G06T 3/4046* (2013.01);
(Continued)

(58) Field of Classification Search
CPC .... H04N 19/124; H04N 19/176; H04N 19/59; H04N 19/103
See application file for complete search history.

(56) References Cited

U.S. PATENT DOCUMENTS 7,751,633 B1 * 7/2010 Mukherjee ............. H04N 19/15
                                                                 382/232
8,571,104 B2   10/2013 Ye et al.
(Continued)

FOREIGN PATENT DOCUMENTS

JP   2018120549 A   8/2018
JP   2019-506814 A   3/2019
(Continued)

OTHER PUBLICATIONS

Rhu, M., et al., "Compressing DMA Engine: Leveraging Activation Sparsity for Training Deep Neural Networks", arXiv:1705.01626v1, [cs.LG], May 3, 2017, pp. 1-14.
(Continued)

*Primary Examiner* — Zhubing Ren
(74) *Attorney, Agent, or Firm* — Sughrue Mion, PLLC

(57) ABSTRACT

An electronic apparatus includes a memory storing information on an artificial intelligence (AI) model comprising a plurality of layers, and a processor configured to obtain an output image that is processed from an input image using the AI model. The processor is configured to, based on a number of non-zero data values included in operation data output from a first layer among the plurality of layers, compress the operation data according to at least one of a plurality of coding modes and store the compressed data in an internal memory, obtain restoration data corresponding to the operation data by decompressing the compressed data stored in the internal memory, and provide the obtained restoration data to a second layer among the plurality of layers.

18 Claims, 16 Drawing Sheets

(51) Int. Cl.
*H04N 19/103* (2014.01)
*H04N 19/176* (2014.01)
*G06T 3/40* (2006.01)
*H04N 19/184* (2014.01)
*H04N 19/119* (2014.01)

(52) U.S. Cl.
CPC ......... *G06T 3/4053* (2013.01); *H04N 19/103* (2014.11); *H04N 19/119* (2014.11); *H04N 19/124* (2014.11); *H04N 19/176* (2014.11); *H04N 19/184* (2014.11)

(56) References Cited

U.S. PATENT DOCUMENTS

| | | | |
|---|---|---|---|
| 8,599,925 | B2 | 12/2013 | Srinivasan |
| 8,848,789 | B2 | 9/2014 | Bao |
| 9,210,423 | B2 | 12/2015 | Ugur et al. |
| 10,242,311 | B2 | 3/2019 | Lo |
| 10,349,052 | B2 | 7/2019 | Ugur et al. |
| 10,547,852 | B2 | 1/2020 | Chan et al. |
| 2006/0239576 | A1 | 10/2006 | Mukherjee |
| 2007/0223579 | A1 | 9/2007 | Bao |
| 2008/0310745 | A1 | 12/2008 | Ye et al. |
| 2013/0202052 | A1 | 8/2013 | Ugur et al. |
| 2016/0050413 | A1 | 2/2016 | Ugur et al. |
| 2016/0358069 | A1 | 12/2016 | Brothers et al. |
| 2017/0251214 | A1 | 8/2017 | Chan et al. |
| 2018/0189981 | A1* | 7/2018 | Singh ............... G06F 13/10 |
| 2018/0253641 | A1 | 9/2018 | Yachide et al. |
| 2018/0262763 | A1* | 9/2018 | Seregin ............... H04N 19/117 |
| 2018/0350110 | A1 | 12/2018 | Cho et al. |
| 2019/0197420 | A1* | 6/2019 | Singh ............... G06N 3/082 |
| 2019/0197656 | A1 | 6/2019 | Yoda et al. |

FOREIGN PATENT DOCUMENTS

| | | |
|---|---|---|
| KR | 10-2009-0005080 A | 1/2009 |
| KR | 10-2011-0129493 A | 12/2011 |
| KR | 10-2016-0118365 A | 10/2016 |
| KR | 1020160142791 A | 12/2016 |
| KR | 1020180052063 A | 5/2018 |

OTHER PUBLICATIONS

Kim, Y., et al., "A Real-Time Convolutional Neural Network for Super-Resolution on FPGA with Applications to 4K UHD 60 fps Video Services", IEEE, Aug. 8, 2018, pp. 1-14.

Communication dated Aug. 12, 2020, issued by the International Searching Authority in counterpart International Application No. PCT/KR2020/005459 (PCT/ISA/210 and 237).

Waveren, J.M.P., "Real-Time DXT Compression", ID Software, Inc., May 20, 2006, pp. 1-43.

Kim, J., et al., "Accurate Image Super-Resolution Using Very Deep Convolutional Networks", Computer Vision Foundation, CVPR, 2016, pp. 1646-1654.

Gysel, P., et al., "Hardware-Oriented Approximation of Convolutional Neural Networks", ICLR 2016, pp. 1-8.

* cited by examiner (a)

(b)

(c)

(d)

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2019-0113070, filed on Sep. 11, 2019, in the Korean Intellectual Property Office, the disclosure of which is incorporated by reference herein in its entirety.

BACKGROUND

1. Field

The disclosure relates to an electronic apparatus and a controlling method thereof and, for example, to an electronic apparatus performing image processing using an artificial intelligence (AI) model and a controlling method thereof.

2. Description of Related Art

With the development of electronic technologies, various types of electronic apparatuses have been developed. Display apparatuses, used in various places such as a home, an office, a public place, and the like, have been increasingly developed in recent years.

Recently, a demand for a high-resolution image service has been significantly increased. Due to such demand, deep learning-based technology such as super resolution, style transfer, or the like, has been used for image processing.

The super resolution technique is a technology to restore a low-resolution input image to a high-resolution image through a series of image processing operations. For example, a low-resolution input image may be scaled in a horizontal and a vertical direction using a convolutional neural network (CNN) model including a plurality of layers, and the low-resolution image may be restored to a high-resolution image.

For a multi-channel feature map image generated in the deep learning-based super resolution processing, a storage capacity necessary for storing the multi-channel feature map may be reduced by applying a conventional Joint Photographic Experts Group (JPEG), JPEG2000, Portable Network Graphics (PNG), Moving Picture Experts Group (MPEG), or Lempel-Ziv Run-length Coding to compress the image.

However, there may exist a problem in that a basic unit for performing the CNN algorithm and a basic unit for the compression processing do not coincide with each other.

SUMMARY

Embodiments of the disclosure may address the above problems, and may provide an electronic apparatus. The electronic apparatus includes a memory storing information on an artificial intelligence (AI) model comprising a plurality of layers, and a processor configured to obtain an output image that is output from the artificial intelligence (AI) model processing an input image, compress operation data according to at least one of a plurality of coding modes based on a number of non-zero data values included in the operation data output from a first layer among the plurality of layers to obtain compressed operation data, and store the compressed operation data in an internal memory, obtain restoration data corresponding to the operation data by decompressing the compressed operation data stored in the internal memory, and provide the restoration data to a second layer among the plurality of layers.

According to an embodiment, a method for controlling an electronic apparatus storing information on an artificial intelligence (AI) model including a plurality of layers may include, compressing operation data according to at least one of a plurality of coding modes based on a number of non-zero data values included in the operation data output from a first layer among the plurality of layers to obtain compressed operation data, storing the compressed operation data in an internal memory, obtaining restoration data corresponding to the operation data by decompressing the compressed operation data stored in the internal memory, and providing the restoration data to a second layer among the plurality of layers.

BRIEF DESCRIPTION OF THE DRAWINGS

The above and other aspects, and advantages of certain embodiments of the present disclosure will be more apparent from the following detailed description, taken in conjunction with the accompanying drawings, in which.

The same reference numerals may be used to represent the same (or similar) elements throughout the drawings.

DETAILED DESCRIPTION

Figure 1A:
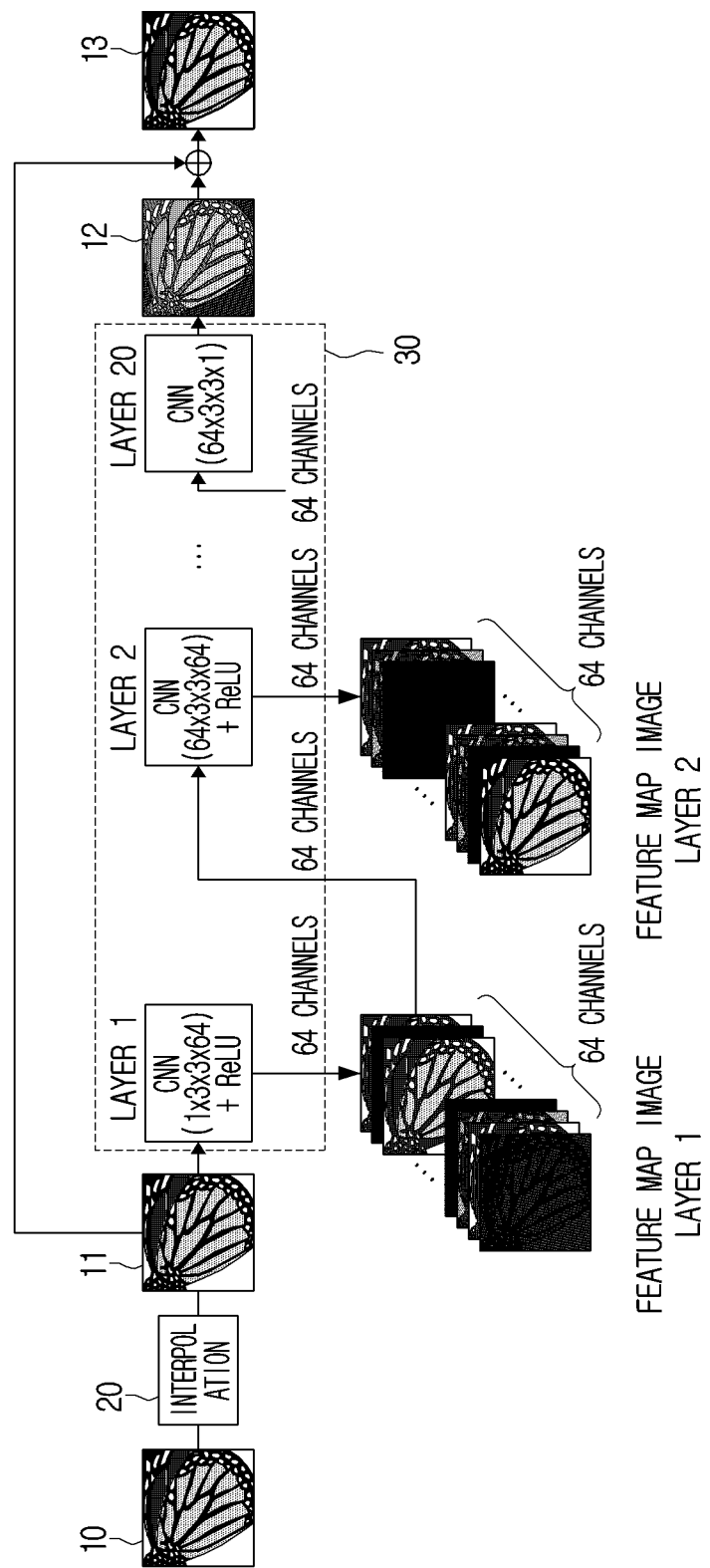
FIG. 1A is a diagram illustrating an image processing operation of an electronic apparatus according to an embodiment.

This disclosure provides an electronic apparatus capable of efficiently compressing operation data with reduced hardware resources in a real-time neural network system and a method for controlling thereof.

The disclosure will be described in greater detail below with reference to the accompanying drawings.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

Expressions such as "at least one of A and/or B" and "at least one of A and B" should be understood to represent "A," "B" or "A and B."

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and may be realized in at least one processor.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1A is a diagram illustrating an image processing operation of an electronic apparatus according to an embodiment.

The electronic apparatus according to an embodiment may be implemented to perform image processing for an input image provided as input to an artificial intelligence (AI) model (or neural network model or learning network model). The AI model may include a plurality of neural network layers. Each of the plurality of neural network layers includes a plurality of parameters (or a plurality of weight values), and may perform a neural network processing operation through an iterative operation leveraging results of a previous layer and a plurality of parameters. The parameters included in the plurality of neural network layers may be optimized by learning results of the AI model. For example, the parameters may be updated such that a loss value or a cost value obtained by the AI model is reduced or minimized during the learning process. The parameters included in the plurality of neural network layers may be optimized by a learning result of the artificial intelligence model. For example, parameters may be updated such that loss values or cost values obtained in the artificial intelligence model during the learning process are reduced or minimized. The artificial neural network may include deep neural network (DNN) and may include, for example, but is not limited to, convolutional neural network (CNN), recurrent neural network (RNN), restricted Boltzmann machine (RBM), deep belief network (DBN), bidirectional recurrent deep neural network (BRDNN), deep Q-networks, or the like.

FIG. 1A illustrates an example of the AI model for super resolution processing according to an embodiment. The super resolution technique may refer to image processing of converting a low-resolution image into a high-resolution image through a series of media and data processing operations.

Referring to FIG. 1A, an electronic apparatus according to an embodiment may perform an interpolation process 20 on an input image 10, e.g., a low-resolution image, and input the interpolated image 11 to an artificial intelligence (AI) model 30 to obtain a residual image 12. That is, the AI model 30 may be implemented as a residual neural network.

The electronic apparatus may obtain an output image 13, for example, a high-resolution image by combining the interpolated image 11 with the residual image 12. The interpolation process may, for example, include a process of scaling an image having a low resolution to a high resolution, and at least one interpolation technique may be used, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like. The residual image may refer to an image including only residual information. The residual information may include, but is not limited to, at least one of an edge direction, an edge intensity, noise information, or texture information as information according to a difference between an input image and a reference image. According to another example, the residual information may include at least one of gray scale information, brightness information, or gamma information.

Figure 1B:
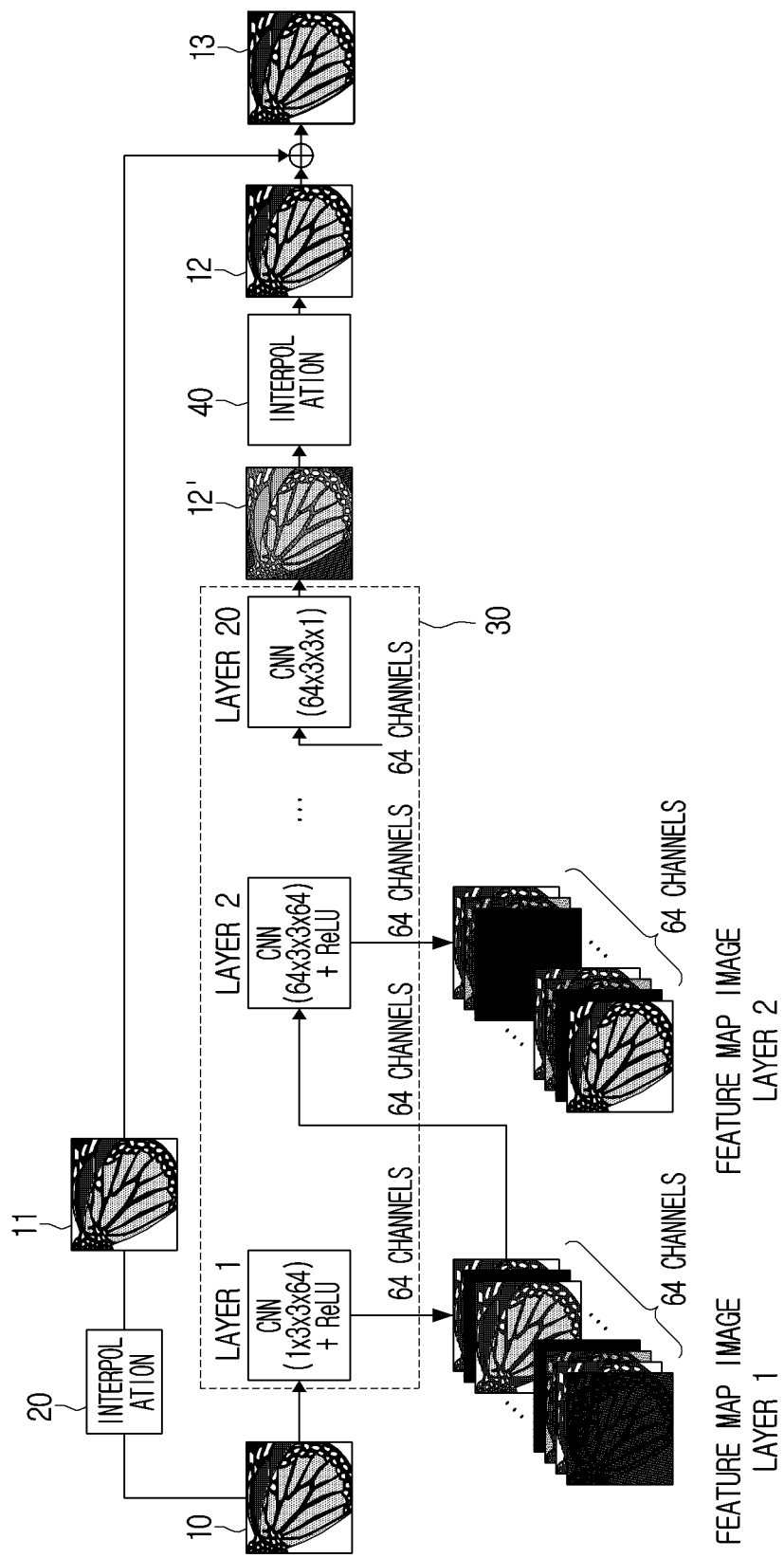
FIG. 1B is a diagram illustrating an example of an artificial intelligence (AI) model for super resolution processing according to an embodiment.

FIG. 1B is a diagram illustrating an example of an artificial intelligence (AI) model for super resolution processing according to an embodiment.

Referring to FIG. 1B, the electronic apparatus may provide an input image 10, e.g., a low-resolution image, as input to the AI model 30 to obtain a residual image 12', and interpolate 40 the residual image 12' to obtain the interpolated residual image 12. The electronic apparatus may perform the interpolation process 20 on the input image 10 to obtain the interpolated image 11. The electronic apparatus may then combine the interpolated image 11 with the interpolated residual image 12 to obtain an output image 13, e.g., a high-resolution image. That is, according to the embodiment shown in FIG. 1B, unlike the embodiment shown in FIG. 1A, the input image 10 may be input to the AI model 30 to initially obtain the residual image 12'.

The AI model 30 used for the super resolution processing as illustrated in FIGS. 1A and 1B may be implemented through learning. Here, being made through learning may refer to a predetermined operating rule or AI model set to perform a desired feature (or purpose) is made by making a basic AI model trained using various training data using learning algorithm. The learning may be accomplished through a separate server and/or system, but is not limited thereto and may be implemented in an electronic apparatus.

Examples of learning algorithms include, but are not limited to, supervised learning, unsupervised learning, semi-supervised learning, or reinforcement learning.

The AI model 30 may include, for example, CNN-based VDSR technology (Jiwon Kim, et al., Accurate Image Super-Resolution Using Very Deep Convolutional Networks, CVPR 2016), EDSR (Enhanced Deep Residual Networks for Single Image Super-Resolution), DRCN (Deeply-Recursive Convolutional Network for Image Super-Resolution." Proceedings of the IEEE Conference on Computer Vision and Pattern Recognition. 2016.), MDSR (Multi-scale deep super-resolution system), or the like, but the embodiment is not limited thereto.

Each of the plurality of neural network layers included in the AI model 30 as described above may include a plurality of parameters, and the AI model 30 may perform neural network operation through processing operation among a plurality of parameters and an operation result of a previous layer.

Figure 1C:
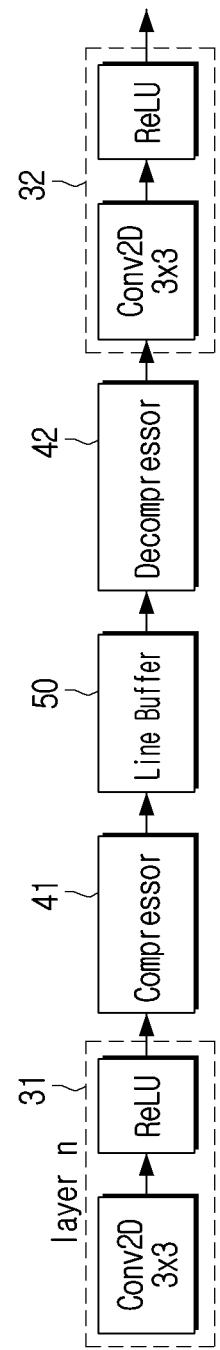
FIG. 1C is a diagram illustrating a process of providing an operation result of an arbitrary layer to a next layer according to an embodiment.

FIG. 1C is a diagram illustrating a process of providing an operation result of an arbitrary layer to a next layer according to an embodiment.

As illustrated in FIG. 1C, the process may include a convolution process and a refined linear unit (ReLU) operation in a layer n 31, a compression operation 41, a line buffer operation 50, a compression operation 42, and a convolution process and a refined linear unit (ReLU) operation in a layer n 32.

According to an embodiment, operation data output through an activation function, for example, a refined linear unit (ReLU) operation, may be output after applying a convolutional filter in an arbitrary layer. In this example, the operation data output from the layer may be multi-channel data, for example, 64 feature maps (or activation map) data may be output. In this example, excessive transmission capacity is required when the feature map data is stored in the memory or read, for example, if the number of layers is 19, reading or writing is required for the feature map data of a total of 1216 (19 layers×64 channels). In this example, if the reading or writing is performed to an external memory of the processor, an excessive amount of transmission bandwidth is required.

In the disclosure, various embodiments of compressing and storing feature map data output from an arbitrary layer as illustrated in FIG. 1C in an internal memory of the processor and then restoring the compressed data to apply the compressed data to a next layer will be described.

Figure 2:
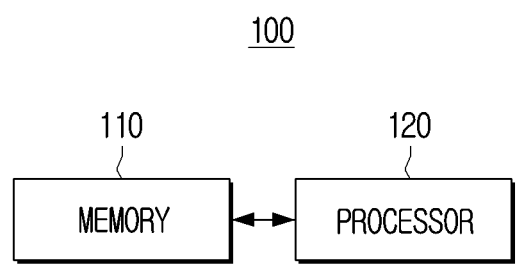
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 includes a memory 110 and a processor 120.

The electronic apparatus 100 may be implemented as a television (TV) or a set-top box, but is not limited thereto, and the electronic apparatus 100 may be implemented as a smartphone, a tablet personal computer (PC), a notebook PC, a head mounted display (HMD), a near eye display (NED), a large format display (LFD), a digital signage, a digital information display (DID), a video wall, a projector display, a camera, a camcorder, a printer, a server, or the like. Alternatively, the electronic apparatus 100 may be a system itself or a virtual system in which a cloud computing environment is established. The embodiment is not limited thereto, and any apparatus processing data using the AI model is applicable without limitation.

According to an example, the electronic apparatus 100 may receive various compressed images or images of various resolutions. For example, the electronic apparatus 100 may receive an image in a compressed form such as a moving picture experts group (MPEG) (for example, MP2, MP4, MP7, etc.), advanced video coding (AVC), H.264, H.265, a high efficiency video codec (HEVC), or the like. The electronic apparatus 100 may receive at least one image among a standard definition (SD), high definition (HD), full HD, ultra HD images.

The memory 110 may store data necessary for various embodiments of the disclosure. The memory 110 may be implemented as a memory embedded in the electronic apparatus 100, or may be implemented as a removable or modular memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like, but the memory is not limited thereto.

According to an example, the memory 110 may store information about an AI model that includes a plurality of layers. Storing information about the AI model may refer, for example, to storing various information related to parameters for describing the computational operation and structure of the AI model, for example, information about a plurality of layers included in the AI model, information about parameters used in each of the plurality of layers, and the like.

According to an embodiment, the memory 110 may store an image received from an external device (for example, a source device), an external storage medium (for example, universal serial bus (USB), external server (for example, a web hard). Herein, the image may be a digital moving image or a still image, but the image is not limited thereto.

According to a still another example, the memory 110 may store various image information required for image processing, for example, texture information for texture processing, edge information for edge processing, or the like. The memory 110 may store a final output image generated by image processing.

According to an example embodiment, the memory 110 may be implemented as a single memory that stores data generated in various operations in accordance with the disclosure. However, according to an embodiment, the memory 110 may be implemented to include a plurality of memories.

The processor 120 is electrically connected to the memory 110 to control the overall operation of the electronic apparatus 100. The processor 120 may be configured with one or a plurality of processors. For example, the processor 120 may perform the operation of the electronic apparatus 100 according to various embodiments of the disclosure by executing at least one instruction stored in the memory 110.

The processor 120 according to an embodiment may be implemented with, for example, and without limitation, a digital signal processor (DSP) for image-processing of a digital image signal, a microprocessor, a graphics processor (GPU), an AI (AI) processor, a neural processor (NPU), a time controller (TCON), or the like, but the processor is not limited thereto. The processor 110 may include, for example, and without limitation, one or more among a central processor (CPU), a micro controller unit (MCU), a micro processor (MPU), a controller, an application processor (AP), a communication processor (CP), an advanced reduced instruction set computing (RISC) machine (ARM) processor, a dedicated processor, or may be defined as a corresponding term. The processor 110 may be implemented in a system on chip (SoC) type or a large scale integration (LSI) type which a processing algorithm is built therein, application specific integrated circuit (ASIC), or in a field programmable gate array (FPGA) type.

Further, the processor 120 for executing the AI model according to an example embodiment may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like, but the processor is not limited thereto. The processor 120 may control processing of the input data according to a predefined operating rule or AI model stored in the memory 110. If the processor 120 is an AI-only processor, the processor 120 may be designed with a hardware structure specialized for the processing of a particular AI model. For example, hardware specific to the processing of a particular AI model may be designed into a hardware chip, such as an application specific integrated circuit (ASIC), a field programmable gate array (FPGA), or the like.

The processor 120 operates to process and manipulate the input data to obtain output data. The input data may include, for example, and without limitation, at least one of text, image, user voice, or the like. For example, the input data may be input via a user input, such as a communicator (e.g., including communication circuitry) capable of communicating with an external device, a keyboard or a touch pad, a camera, a microphone, or the like. The output data may be in various forms depending on the type of AI model. For example, the output data may be an image with improved resolution, object-related information included in the image, text corresponding to voice, or the like. Hereinafter, for convenience, the example where the input data is an input image will be described.

According to an embodiment, the processor 120 may obtain an output image by performing image processing for an input image. The input image and the output image may be a standard definition (SD), high definition (HD), full HD, ultra HD (UHD), or the like. The output image may be the UHD image, for example, a 4K (3840×2160) image, an 8K (7680×4320) image, or an image having a higher resolution (for example, 16K, 32K), but the input image and the output images are not limited thereto. The image processing may be digital image processing including at least one of image enhancement, image restoration, image conversion, image analysis, image understanding, or image compression, or the like, but the image processing is not limited thereto.

According to an embodiment, the processor 120 may obtain an output image by processing an input image using an AI model. For example, the processor 120 may load and use AI model-related information stored in an external memory such as dynamic random access memory (DRAM).

The processor 120 may pre-process the input image and process the pre-processed image using the AI model to obtain an output image. Here, the pre-processing may include, but is not limited to, an interpolation process, and may include various image processing capable of improving the image quality of the input image without using an AI model. Hereinafter, for convenience, it will be described that the input image is interpolated.

According to an embodiment, the processor 120 may interpolate the input image and obtain an output image obtained from performing processing on the interpolated image using the AI model. According to an embodiment, the processor 120 may obtain an output image by inputting an input image into the AI model in parallel with interpolating the input image. For example, the processor 120 may perform interpolation using at least one interpolation technique such as bilinear interpolation, nearest neighbor interpolation, bicubic interpolation, deconvolution interpolation, subpixel convolution interpolation, polyphase interpolation, trilinear interpolation, and linear interpolation.

The AI model may process an input image or an interpolated image through an operation using a plurality of neural network layers (hereinafter, referred to as layers) to output the processed image. As an example, the AI model may generate and provide a residual image as output of the AI model. Each of the plurality of layers may generate a residual image for an interpolated image using a filter including different parameters. Here, the parameter may be the weight (or coefficient) of the filter. In this example, the AI model may perform an operation using various types of activation functions, such as the identity rule function, the logistic sigmoid function, the hyperbolic tangent (tan h) function, the ReLU function, the leaky ReLU function, or the like. However, the AI model does not necessarily generate only the residual image, and may process the input image in various ways according to an implementation example of the AI model, and output the processed image.

According an embodiment, the processor 120 may process an input image using one AI model, but according to an embodiment, the processor 120 may process an input image using a plurality of AI models. In this example, the plurality of AI models may operate sequentially or operate in parallel. As an example, the processor 120 may provide the input image to the first AI model to obtain an output of the first AI model. Then, the output of the first AI model may be provided as input to the second AI model. As a result, an output image based on the image output from the second AI model may be provided as an output of the AI processing. As another example, the processor 120 may provide the input image as separate input to each of the first AI model and the second AI model. Accordingly, the processor 120 may obtain an output image based on a plurality of images output in parallel from the first AI model and the second AI model. For example, the plurality of AI models may include a model that generates a first residual image, and a model that generates a second residual image. The plurality of AI models may include, for example, a model for upscaling of resolution, and a model for noise reduction. The plurality of AI models may include a model for object area processing, and a model for background area processing.

The processor 120 may obtain an output image based on an image output from the AI model, for example, a residual image and a pre-processed image, for example, an interpolated image. For example, the processor 120 may add up the pixel values included in the interpolated image and the pixel values included in the residual image to correspond to pixel units to obtain an output image. The processor 120 may obtain an output image based on the first and second residual images and the pre-processed image output from the first and second AI models, respectively. Alternatively, the processor 120 may input a first residual image output from the first AI model to the second AI model to obtain an output image based on the second residual image and the pre-processed image.

As described above, the processor 120 may input an input image or an interpolated image to at least one AI model to obtain a residual image. Hereinafter, for convenience, an example in which an interpolated image is input to one AI model to obtain a residual image will be described. The various embodiments according to the disclosure may be applied to a configuration in which an input image is input to an AI model to obtain a residual image, and a configuration in which a residual image is obtained by using a plurality of AI models.

According to an embodiment, the processor 120 may compress the operation data according to at least one of a plurality of coding modes (compression modes) based on the number of non-zero (NNZ) in the operation data output from the first layer, among a plurality of layers included in the AI model, and store the compressed data in an internal memory. The internal memory may be implemented as an N-line memory, for example, an N-line buffer. In an embodiment, the memory capacity may be limited according to the hardware limitations of the processor 120. For example, the line buffer may be implemented as a register, a cache memory, or the like, but may be implemented without limitation if it is possible to temporarily store data. Accordingly, the processor 120 may perform guaranteed compression not exceeding the allowable data size according to the size of the internal memory.

The processor 120 may decompress the compressed data stored in the internal memory to obtain restoration data (or restored data) corresponding to the operation data, and provide the obtained restoration data to a second layer of the plurality of layers. The second layer may be a next layer of the first layer. For example, if the first layer is a $n^{th}$ layer, the second layer may be an $n+1^{th}$ layer.

According to an embodiment, the plurality of coding modes may include at least one of a lossless coding mode or a lossy coding mode. In this example, the lossy coding mode may include at least one of a first lossy coding mode, a second lossy coding mode, or a third lossy coding mode. In this example, the data compressed according to the first lossy coding mode may include a non-zero value position information, a maximum value of the non-zero values, and a quantized value of the non-zero values. In addition, the data compressed according to the second lossy coding mode may include a non-zero value position information, a maximum value of the non-zero values, a bias value of a non-zero value, and a quantized value of a non-zero value. The data compressed according to the third lossy coding mode may include a maximum value of the non-zero values and a quantized value of the non-zero values.

According to an embodiment, the processor 120 may divide the operation data into a plurality of blocks, identify the size of the compression unit based on the number of non-zero data values included in each of the plurality of blocks, and perform compression according to one of the plurality of coding modes in the identified compression unit. The processor 120 may calculate a ratio to which the lossless compression is applied to the operation data based on a coding mode of each of the plurality of blocks identified according to the number of non-zero data values included in each of the plurality of blocks, and identify the size of the block to which the calculated ratio reaches the maximum as the size of the compression unit.

According to one embodiment, the processor 120 may perform compression in a coding block basis. Specifically, the processor 120 may divide one coding block into at least one sub-coding block and identify the size of the base unit of compression based on the number of non-zero data values included in each of the sub-coding blocks. The coding block may refer to block data of a predetermined size in the operation data, may be a unit of data to be compressed. The compression basic unit may be a data unit in which actual compression occurs. In other words, the processor 120 may divide one coding block into at least one sub-coding block and perform compression separately for each sub-coding block, thereby performing compression for one coding block.

According to an example, if the feature map data output from the first layer is a three-dimensional data of H(height) *W(width)*C(channel), the coding block may include data for each of a plurality of channels included in the feature map data. This is because a particular pixel value of the same position needs to be simultaneously used in each of the plurality of channel data for a processing operation in the layer, for example, a convolutional neural network (CNN) operation.

The size of the coding block may be identified as a predetermined size based on the size of operation data, internal memory capacity, compression performance, or the like, and is variable depending on one or more variables for processing the data. For example, the CNN operation processing may be performed in a unit of a line, but compression may be performed in a coding block unit in a data by a unit of a line.

The processor 120 may dynamically vary the number of bits allocated for compression of each operation data based on each of the operation data by channels output from the first layer to perform compression.

According to an example, if the operation data is a float type, the processor 120 may convert the float type operation data to a fixed-point type and dynamically vary the number of bits allocated for quantization of each integer part and fractional part based on the length of at least one of an integer part or a fractional part of the converted operation data. For example, the processor 120 may dynamically vary the number of bits based on the maximum integer length of the integer length of the non-zero values included in the operational data for each channel that is converted.

Figure 3:
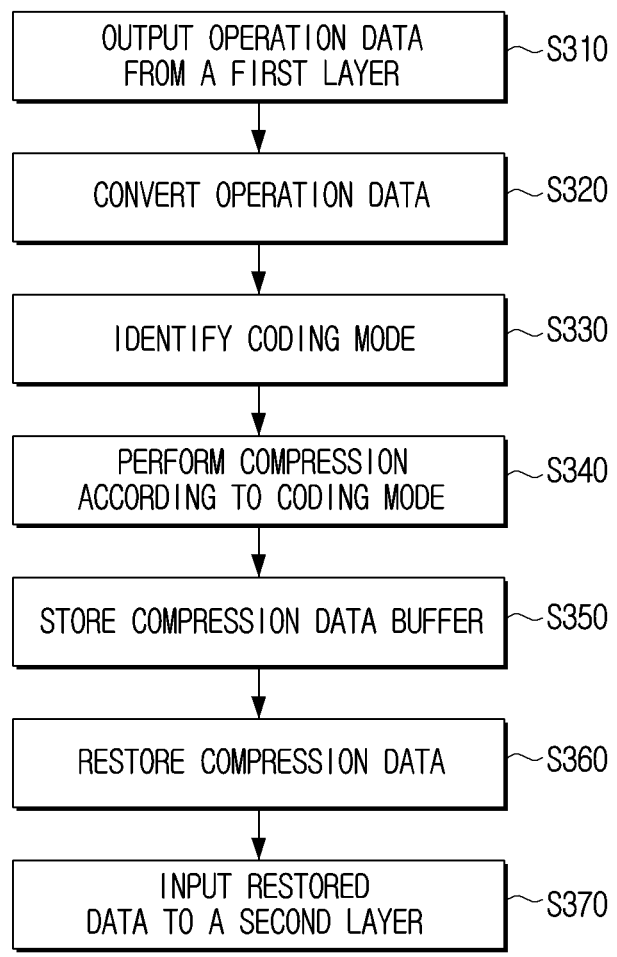
FIG. 3 is a flowchart illustrating an operation of an electronic apparatus according to an embodiment.

With reference to FIG. 3, an operation of the electronic apparatus 100 will be further described.

FIG. 3 is a flowchart illustrating an operation of an electronic apparatus according to an embodiment.

Referring to FIG. 3, if the operation data is output from the first layer included in the AI model in operation S310, the processor 120 may convert the output operation data in operation S320. For example, the operation data output from the first layer may be a feature map (or activation map) data. According to an example, the operation data output from the first layer may be a float type, and the processor 120 may convert the float type operation data to a fixed-point type. The process of converting operation data in operation S320 will be described in detail with respect to FIG. 4.

Figure 4:
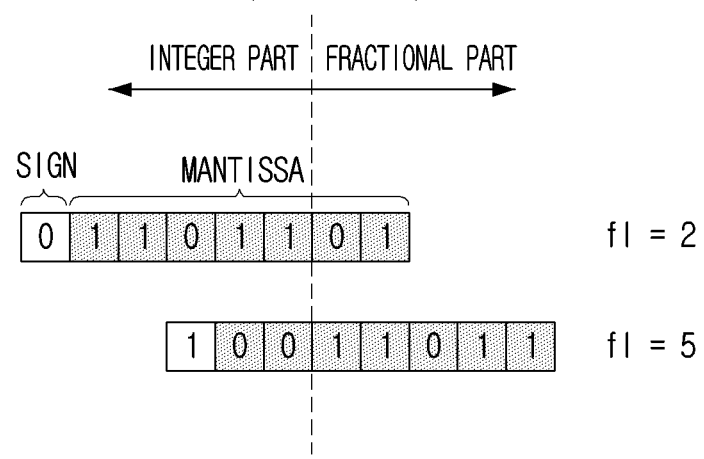
FIG. 4 is a diagram illustrating a method for converting operation data according to an embodiment.

FIG. 4 is a diagram illustrating a method for converting operation data according to an embodiment.

According to an embodiment, the processor 120 may convert the operation data, for example, float type feature map data output from each layer included in the AI model into a fixed-point type to reduce the data size. For example, 32-bit float type feature map data may be converted into 8-bit to 16-bit fixed-point type. By reducing the basic size of the data, the amount of operation may be reduced, and the size of the memory may be reduced. For example, converting a 32-bit float type to an 8-bit fixed-point type may reduce the data size to one quarter of the original size. However, the same type of type conversion may be performed on the parameters used in each layer, that is, the weight parameter. The following is a description of the case of converting the feature map data. In this example, the processor 120 may analyze the operation data for each layer or the data for each channel of the operation data to perform a dynamic conversion for each operation data.

Thus, FIG. 4 is a diagram illustrating a method for converting the fixed-point value to the dynamic fixed-point value. According to FIG. 4, the fixed-point value may include an integer part and a fractional part.

According to an embodiment, the processor 120 may calculate an optimal value of an integer length (IL) representing a length of an integer part and a fractional length (FL) of a fractional part, respectively, for each layer-specific operation data or channel-specific data of the operation data. The processor 120 may convert the calculated optimal value into a dynamic fixed-point value. The processor 120 may vary the integer part of the fixed-point value and the bit-width of the fractional part by layers or channels in a diverse manner. For example, an existing technique (P. Gysel et al., "Hardware-oriented Approximation of Convolutional Neural Networks," arXiv:1604.03168) for diversifying FL by layer may be used. This will be described in more detail with reference to FIG. 10.

Returning to FIG. 3, the processor 120 may identify a coding mode for the operation data converted based on the converted operation data in operation S330.

According to an embodiment, the processor 120 may variously apply a lossless or lossy compression scheme according to the number of non-zero data values, using the operation data, for example, a characteristic in which a number of values included in the feature map has a zero value. For example, the processor 120 may perform compression in a per coding unit. That is, the processor 120 may variously apply the lossless or lossy compression scheme according to the number of non-zero data values included in the coding block. Here, the coding block may be block data of a predetermined size in the feature map. The size of the coding block may be identified to be a predetermined size based on operation data size, internal memory capacity, compression performance, or the like, and may vary depending on situations. The process of identifying the coding mode in operation S330 will be described in detail with respect to FIGS. 5 and 6.

Figure 5:
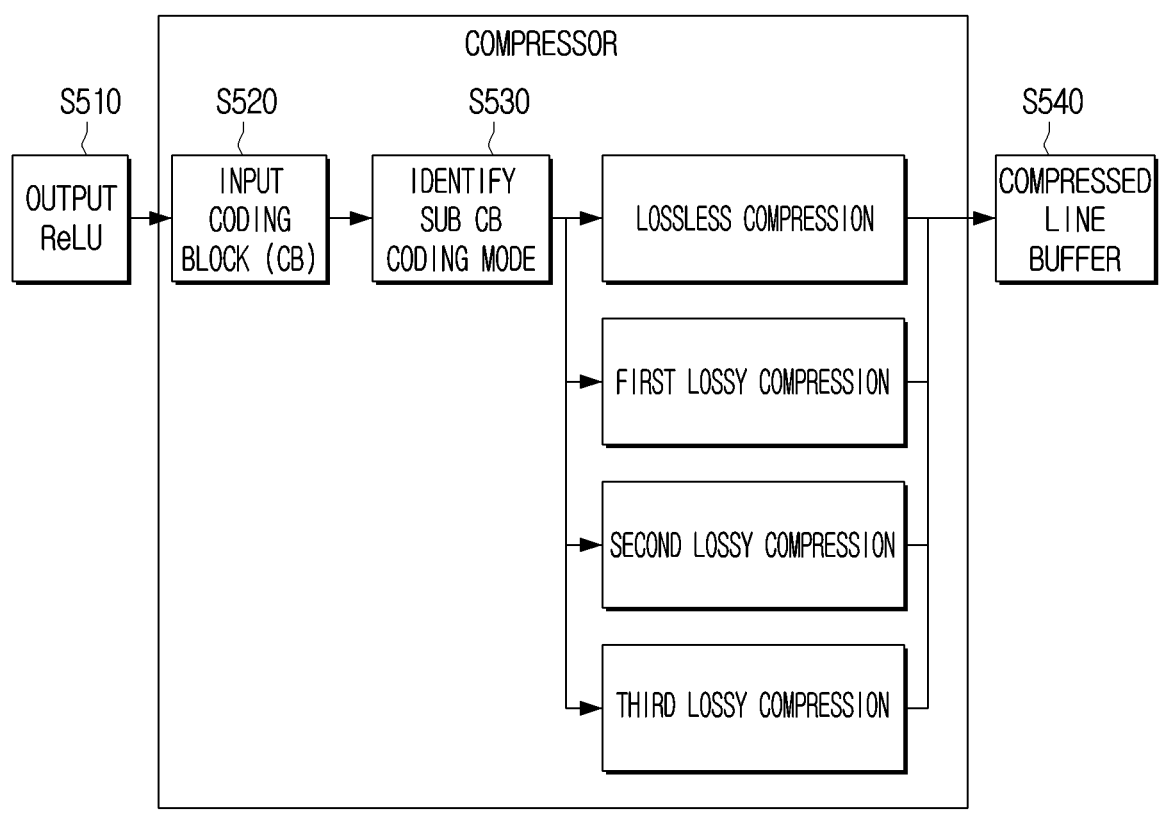
FIG. 5 is a diagram illustrating a method for identifying a coding mode according to an embodiment.
Figure 6:
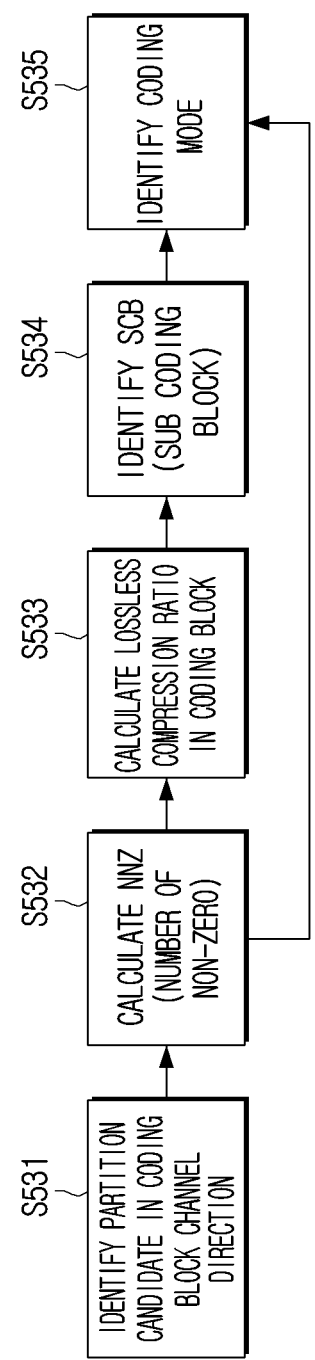
FIG. 6 is a diagram illustrating a method for identifying a coding mode according to an embodiment.

FIGS. 5 and 6 are diagrams illustrating a method for identifying a coding mode according to an embodiment.

The processor 120 may identify the coding mode in a coding block unit included in the operation data operated through an activation function after applying a filter in each layer included in the AI model.

For example, as shown in FIG. 5, the processor 120 may determine a coding block in the feature map data that are output in operation S510 through the ReLU operation after applying the convolutional filter of each layer in the CNN model in operation S520, and identify a size of the sub-coding block which is a compression basic unit in each coding block unit, and determine a coding mode corresponding to the determined sub-coding block (hereinafter, an SCB coding mode) in operation S530.

As shown in FIG. 6, a coding block is partitioned in a channel direction to identify a partition candidate in operation S531. Then, the number of non-zero data values for each partition candidate is calculated in operation S532, the coding mode for each partition candidate is determined based on the calculated number of non-zero data values, and the lossless compression ratio in the coding block is calculated based on the identified coding mode in operation S533. Next, the partition candidate having the maximum lossless compression ratio in the coding block is identified as a sub-coding block, i.e., a compression basic unit in operation S534. Then, a coding mode corresponding to each of the identified sub-coding blocks may be identified in operation S535. That is, the coding mode for each of the partition candidates to which the lossless compression ratio in the coding block reaches the maximum may be identified as the coding mode to which the coding mode is actually applied.

Returning to FIG. 5, the processor 120 may write and store the compressed data according to the identified coding mode into a line buffer in operation S540. In this example, the operations S520, S530, and S540 may be performed through a compressor (or an encoder). The compressor (or encoder) may be implemented in at least one software or at least one hardware or a combination of at least one software and at least one hardware. For example, software or hardware logic corresponding to a compressor (or encoder) may be implemented within the processor 120. However, the embodiment is not limited thereto, and software or hardware logic corresponding to operations of the compressor may be implemented within a single chip, and software or hardware logic corresponding to others may be implemented in other chips.

Figure 7A:
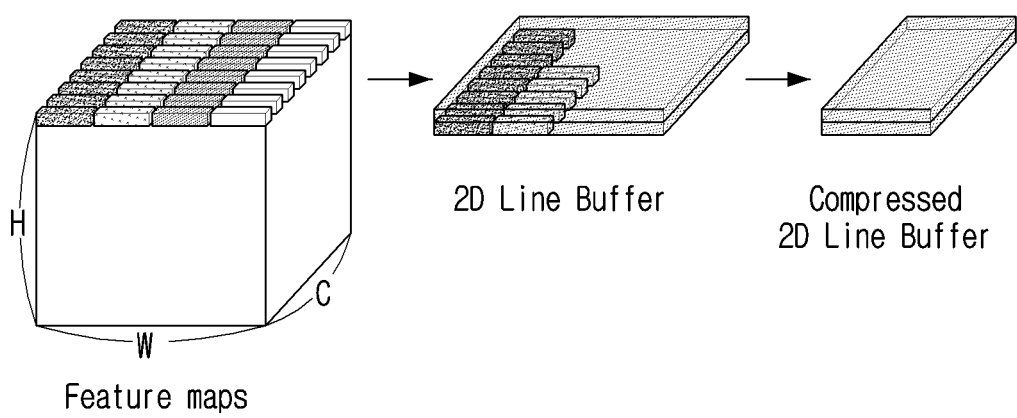
FIG. 7A is a diagram illustrating a method for storing compression data according to an embodiment.
Figure 7B:
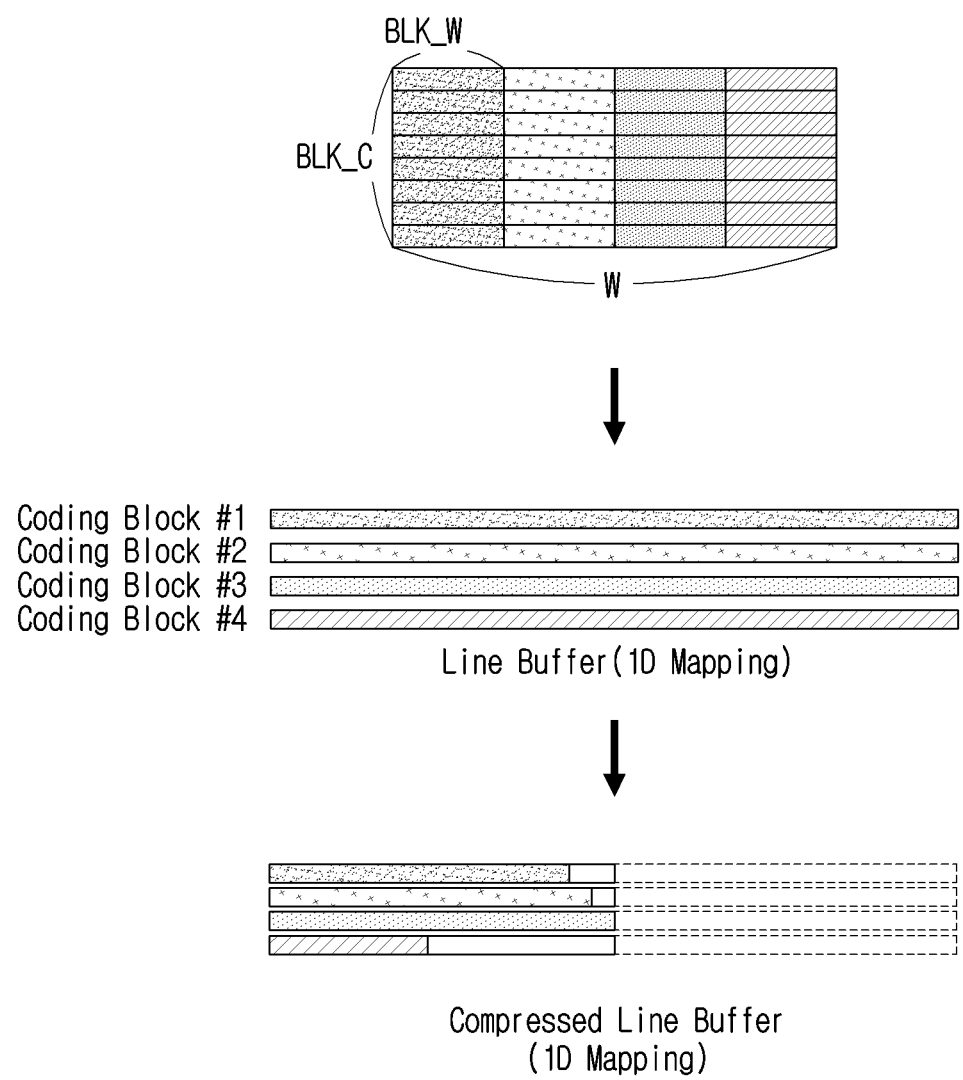
FIG. 7B is a diagram illustrating a method for storing compression data according to an embodiment.

FIGS. 7A and 7B are diagrams illustrating a method for storing compression data according to an embodiment.

The processor 120 may store the compressed feature map data in a 2D line buffer as shown in FIG. 7A according to an embodiment. For example, the feature map data may be three-dimensional data of H (height)*W (width)*C (channel). In this example, as shown in FIG. 7A, the 2D line buffer may be implemented as a 2D buffer of W (width)*C (channel) and may have a compressed size when compression according to an embodiment has been performed.

According to one embodiment, the processor 120 may perform compression to secure a maximum compression rate (e.g., ½) in a per coding block unit. For example, as shown in FIG. 7B, even though the compression ratio is different in units of coding blocks, compression may be performed not to exceed the maximum allowable data size based on the size of the 2D line buffer. Here, the coding block may include data for each of a plurality of channels included in the feature map data. This is because the data information between different channels is used in the operation of the layer. For example, the coding block may have a size of BLK_W*BLK_C in FIG. 7B, and perform compression not to exceed the maximum allowable data size for each coding block BLK_W*BLK_C. Here, BLK_W may represent a horizontal data size of a coding block, and BLK_C may represent a plurality of channel data sizes (or numbers) corresponding to a coding block.

Referring to FIG. 3, the processor 120 may obtain the restored feature map data by decompressing the compressed data, and provide the restored feature map data to a next layer.

Figure 8:
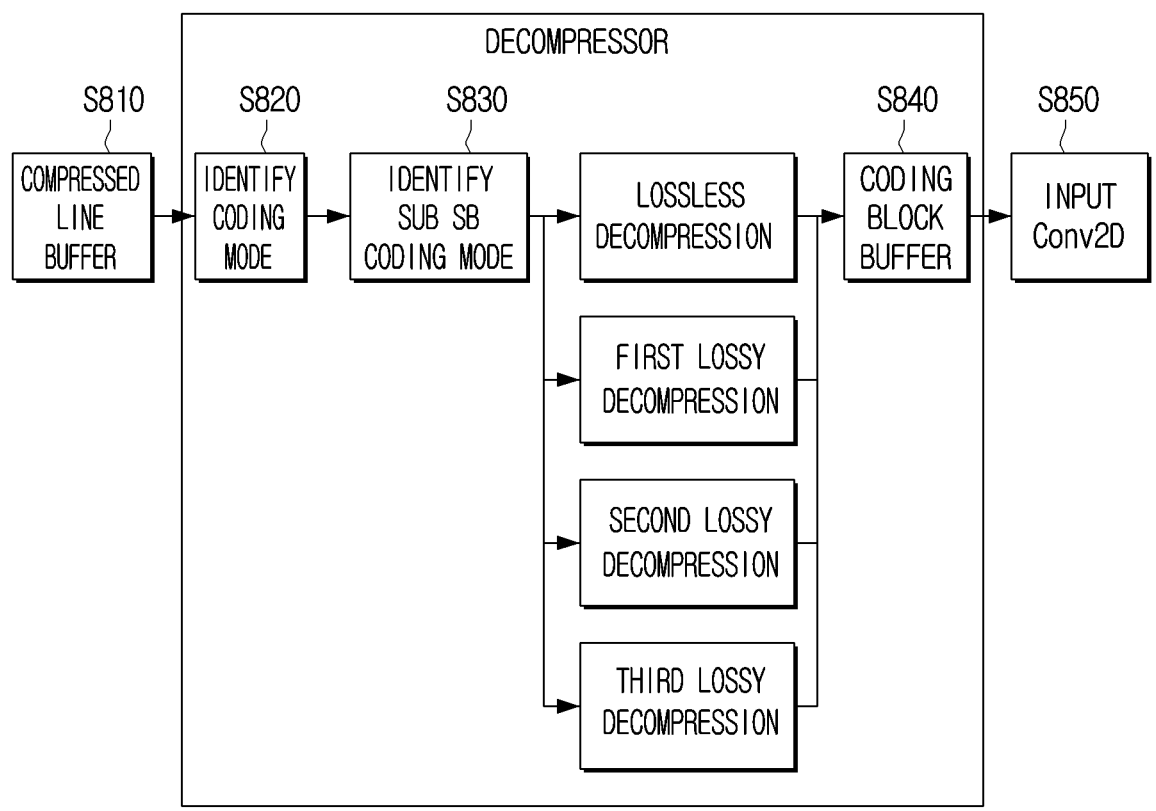
FIG. 8 is a diagram illustrating a method of decompression according to an embodiment.

FIG. 8 is a diagram illustrating a method of decompression according to an embodiment.

As illustrated in FIG. 8, the processor 120 may restore the compressed data by decompressing the feature map data that is compressed and stored in an internal memory, for example, a line buffer.

Specifically, the processor 120 may read the bits of the compressed feature map data from the line buffer in operation S810 and may identify the coding mode performed when compressing the feature map data in operation S820. In this example, because the compression itself has been performed by the processor 120, the processor 120 may be aware of the coding mode, but the coding mode information for the compressed data may be included in the compressed data.

The processor 120 may then perform decompression for each sub-coding block included in the compressed data based on the coding mode in operation S830. In this example, the processor 120 may perform the decompression operation while storing the decompressed data in the buffer in operation S840. Thereafter, if compression of all the sub-coding blocks included in the compressed data is decompressed, and the restoration data for the compressed data, that is, the restoration data corresponding to the coding block is obtained, the obtained restoration data may be input to the second layer for convolution operation in the second layer in operation S850. In this example, the operations S810, S820, and S830 may be performed through a decompressor (or a decoder). Here, an implementation example of the decompressor (or decoder) is similar to the embodiment of the compressor (or encoder) described above, and thus a redundant description thereof will be omitted.

Figure 9:
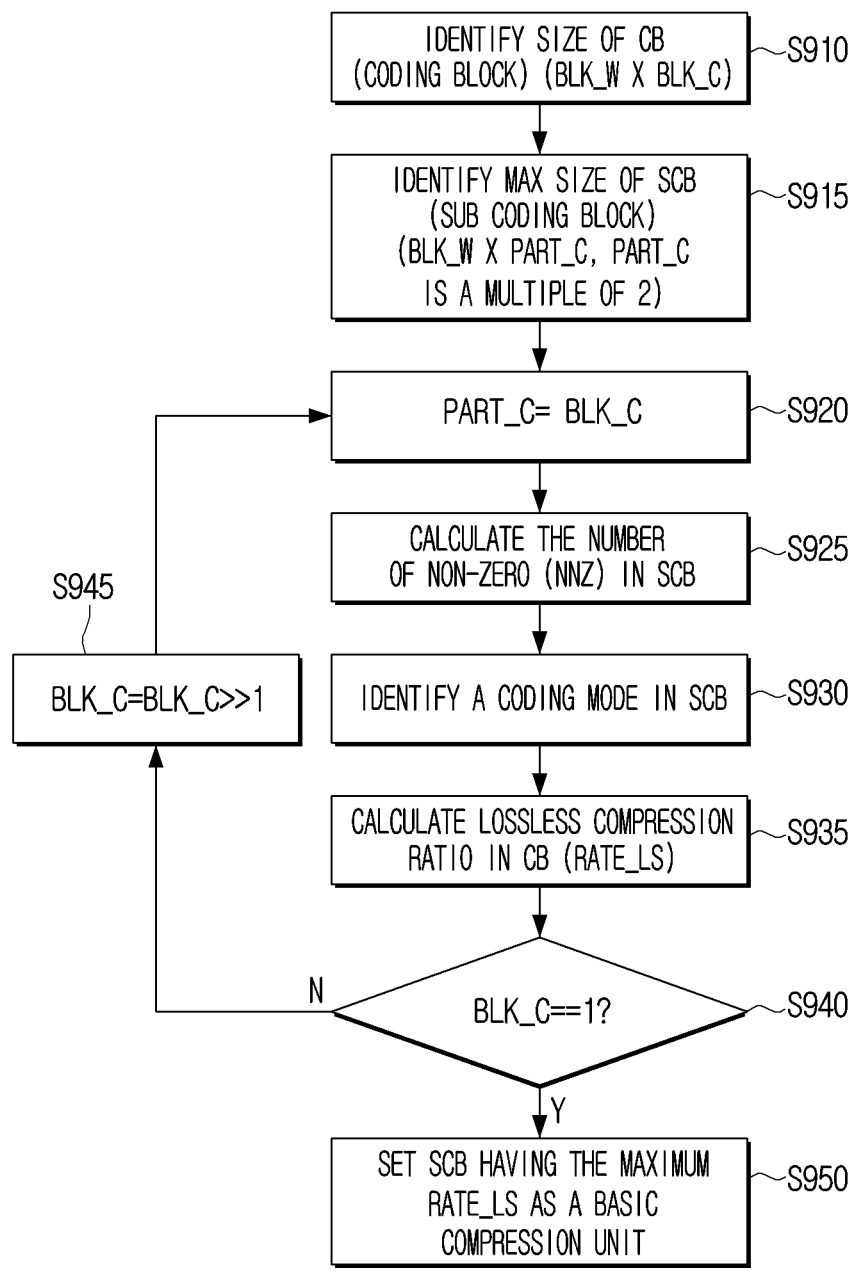
FIG. 9 is a diagram illustrating a method for identifying a compression basic unit of each coding block according to an embodiment.

FIG. 9 is a diagram illustrating a method for identifying a compression basic unit of each coding block according to an embodiment.

The processor 120 identifies the maximum size of the SCB in operation S915. For example, the maximum size of the SCB may be identified to be BLK_W*PART_C (PART_C is a multiple of two).

The processor 120 calculates the number of non-zero (NNZ) data values in each SCB in operation S925, starting from the maximum size of the SBC being BLK_W*PART_C (PART_C=BLK_C) in operation S920.

The processor 120 identifies the coding mode of each SCB based on the NNZ data values in each SCB in operation S930.

The processor 120 calculates lossless compression rate (RATE_LS) in the coding block based on the SCB in which lossless compression is performed in operation S935.

If it is not BLK_C=1 (S940:N), the processor 120 repeats the step S935. That is, the processor 120 may partition the coding block in the channel direction to gradually reduce the size of the BLK_C in step S945, and repeat the steps S920 to S935 to obtain a lossless compression ratio in the coding block for each size of the BLK_C.

If BLK_C=1 (S940:Y), that is, steps S920 to S935 are repeated until BLK_C becomes a minimum unit, the processor 120 sets the SCB having the maximum lossless compression ratio on the basis of the lossless compression ratio in the coding block calculated until now, based on the lossless compression ratio in the currently calculated coding block calculated in operation S950.

The processor 120 may identify the coding mode of each SCB according to a predetermined criterion in step S930. For example, the processor 120 may identify a coding mode of each SCB based on a predetermined non-zero number data values depending on the size of each SCB. Table 1 below shows the criteria of the coding mode according to one example.

TABLE 1

| | BLK_W = 8, BLK_C = 8 | | | | Non-zero | Bias | |
| --- | --- | --- | --- | --- | --- | --- | --- |
| MODE | PART C = 1 | PART_C = 2 | PART_C = 4 | PART_C = 8 | Position | Value | Coding Modes |
| 0 | Nnz <= 3 | Nnz <= 6 | Nnz <= 13 | Nnz <= 26 | ○ | X | Lossless compression |
| 1 | — | — | — | — | ○ | X | First lossy compression |
| 2 | — | — | — | — | ○ | ○ | Second lossy compression |
| 3 | Nnz > 6 | Nnz > 16 | Nnz > 32 | Nnz > 60 | X | X | Third lossy compression |

According to an embodiment, the processor 120 may calculate a lossless compression ratio of the entire coding block (CB) according to the size of each sub-coding block (SCB) while gradually decreasing the size of the sub-coding block (SCB) from the maximum size within the coding block, and may identify the size of the sub-coding block (SCB) at which the lossless compression ratio reaches the maxim as the compression basic unit.

Referring to FIG. 9, the processor 120 identifies the size of the coding block (CB), that is, BLK_W*BLK_C in operation S910. Here, the BLK_W may represent a horizontal data size of the coding block, and BLK_C may represent sizes (or numbers) of a plurality of channel data corresponding to the coding block. The size of the coding block may be identified to be a predetermined size based on operation data size, internal memory capacity, compression performance, or the like, and may vary depending on situations.

According to Table 1, the coding mode may include a lossless coding mode (mode 0), a first lossless coding mode (mode 1), a second lossless coding mode (mode 2), and a third lossless coding mode (mode 3).

As shown in Table 1, a threshold number of non-zero data values according to a partition, that is, a sub-block size, may be predetermined for each coding mode, which may be identified as an appropriate value by an experiment or the like. For example, a threshold number of non-zero data values may be identified based on the magnitude of the degradation after compression.

The lossless coding mode may be defined as a configuration in which the number of non-zero data values is less than the first threshold number for each sub-block included in the coding block, and the compressed data compressed according to the lossless coding mode may include non-zero value position information. The lossy coding mode may be defined as a configuration in which the number of non-zero data values is greater than or equal to the first threshold number for each sub-block included in the coding block. This is because, if the number of non-zero data values is small, compression performance may be satisfied while minimizing degradation of loss, but if the number of non-zero data values is large, lossy compression needs to be performed in consideration of the capacity of the compressed data.

The first lossy coding mode and the second lossy coding mode may be defined as a configuration in which the number of non-zero data values for each sub-block is greater than or equal to the first threshold number and less than the second threshold number, and the compressed data compressed according to the first and second lossy coding modes may include non-zero value position information. The compressed data compressed according to the first lossy coding mode does not include a bias value, but the compressed data compressed according to the second lossy coding mode may include a bias value. For example, if the sizes of non-zero data values in a sub-block are evenly distributed, the data may be compressed according to the first lossy coding mode that does not apply a bias value. If the sizes of the non-zero values are biased to a particular range, the data may be compressed according to a second lossy coding mode that applies a bias value.

Figure 10:
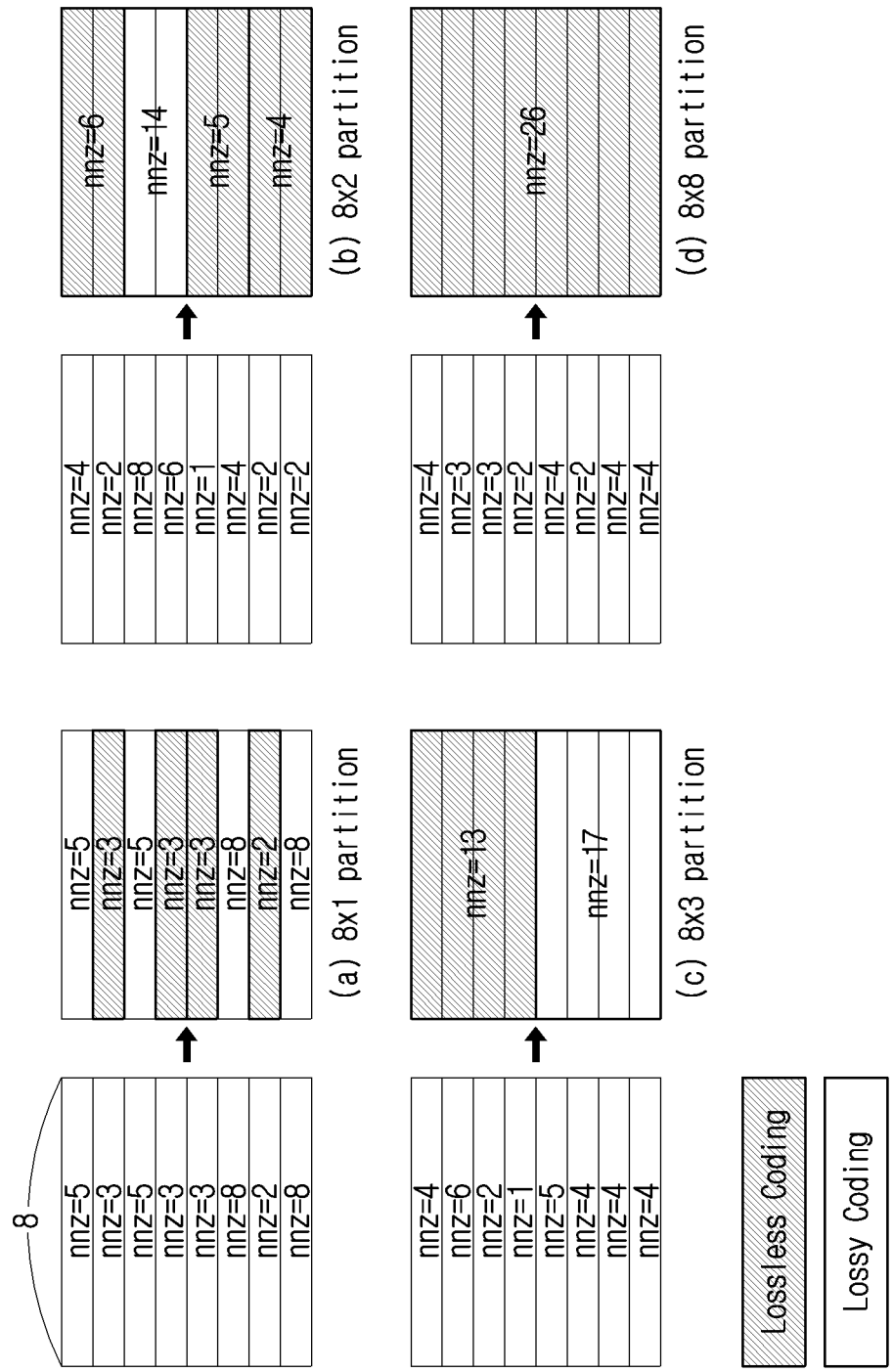
FIG. 10 is a diagram illustrating a configuration of compressed data by coding modes according to an embodiment.

FIG. 10 is a diagram illustrating a configuration of compressed data by coding modes according to an embodiment.

According to an embodiment, the compressed data generated according to a lossless coding mode or a lossy coding mode may include information related to non-zero data value position and non-zero data value itself. For example, the information associated with the non-zero data value itself may include at least one of a non-zero data value itself according to a coding mode, a maximum value among the non-zero data values, quantized index information quantized to an intermediate value between 0 and a maximum value of the non-zero data value, a minimum value of a non-zero data value, or quantized index information quantized to intermediate data values between the minimum value and the maximum value among the non-zero data values.

As illustrated in (a) of FIG. 10, there may be compressed data generated according to a lossless coding mode, in which case the compressed data may include non-zero value position information and non-zero value itself included in the operation data. For example, the processor 120 may compress the operation data according to the lossless coding mode if the number of non-zero data values included in the operation data is less than the first threshold number. For example, if the sub-coding block, which is the basic compression unit, is 8-bit data and the number of data in the sub-coding block (including the zero value) is 16, the positon information of the non-zero data value may be represented using the 16 bits. For example, the non-zero value in each of the 16 bits corresponding to each of the 16 data may be represented as "1" and a zero value may be represented as "0." Each of the non-zero values may be represented using eight (8) bits.

As illustrated in (b) of FIG. 10, there may be compressed data generated according to the first lossy coding mode, and the compressed data generated according to the first lossy coding mode may include non-zero value position information included in the operation data, a maximum value among the non-zero data values, and quantization index information of each of the non-zero data values. For example, the processor 120 may compress the operation data according to the first lossy coding mode, if the number of non-zero data values included in the operation data is greater than or equal to the first threshold number and less than the second threshold number. For example, if the sub-coding block, which is the basic compression unit, is 8-bit data and the number of data in the coding block of the operation data (including the zero value) is 16, the position information of the non-zero data value is represented using 16 bits, the maximum value of the non-zero data value may be represented by using 8 bits, and the quantized index value of each of the non-zero data values may be represented by using 5 bits. For example, by using 5 bits for each of the non-zero data values, a section between 0 and the maximum value may be divided into 32 sections, and the information on the section to which the non-zero data value belongs among the 32 sections may be represented by 5 bits. For example, if the maximum value of the non-zero data values is 218, the values of 1 to 218 may be divided into 32 sections, and a quantized index value for each section may be generated. For example, the first section may include 1 to 7 values, the second section may include 8 to 14 values, the third section may include 15 to 21 values, the 31 section may include 211 to 217 values, and the last section may represent the maximum value 218. In this example, the first section (1*step) may be represented as "index 0," the second section (2*step) as "index 1," the third section as "index 2," and the fourth section (3*step) as "index 3," the last section, that is, the maximum value, may be represented as a binary form representing "index 31." In this example, the processor 120 may quantize each non-zero data value into an index value corresponding to the closest section among the 32 sections. For example, if the non-zero data value is 215, the corresponding non-zero value may be represented as "index 31." However, in the above-described embodiment, the sections of 1 to 218 are divided into 32 sections in that the quantized index value represents a non-zero data value other than a zero value, but the sections of 0 to 218 may be divided into 32 sections. The maximum value may not be represented by one index value, that is, "index 31" but a plurality of non-zero data value sections including a maximum value may be represented as "index 31."

Table 2 below illustrates a quantized index value in the second lossy coding mode according to an embodiment as described above.

TABLE 2

| Index 0 | Index 1 | Index 2 | Index 3 | ... | Index 30 | Index 31 |
|---------|---------|---------|---------|-----|----------|----------|
| 1*step  | 2*step  | 3*step  | 4*step  | ... | 31*step  | max      |

The index n may refer that the non-zero value belongs to n+1 section. For example, each step in Table 2 may be represented as an equation such as step=MAX/power(2, index_bits).

As illustrated in (c) of FIG. 10, there may be compressed data generated according to the second lossy coding mode, and the compressed data generated according to the second lossy coding mode may include the position information of the non-zero data value included in the operation data, the maximum value among the non-zero data values, the bias value of the non-zero data value, and the quantization index information of each of the non-zero data values. For example, the processor 120 may compress the operation data according to the second lossy coding mode if the number of non-zero data values included in the operation data is greater than or equal to the first threshold number and less than the second threshold number, and has a bias value of the non-zero data value, e.g., a minimum value other than 0. For example, if the sub-coding block, which is the basic compression unit, is 8-bit data and the number of data in the coding block of the operation data (including the zero value) is 16, the position information of the non-zero data value may be represented by using 16 bits, the maximum value of the non-zero data value may be represented by using 8 bits, the minimum value, that is, bias value, among the non-zero data values may be represented by using 8 bits, and the quantized index value of each of the non-zero data values may be represented by using 5 bits. For example, the section between the minimum value and the maximum value may be divided into 32 sections using 5 bits for each of the non-zero data values, and the section information to which the non-zero data value belongs among the 32 sections may be represented as 5-bit information. For example, if the maximum value of the non-zero data values is 218 and the minimum value, that is, the bias value is 32, the 32-218 value is divided into 32 sections, and the quantized index value for each section may be generated. For example, the first section may include 32 to 37 values, the second section may include 38 to 43 values, the third section may include 44 to 49 values, the $31^{st}$ section may include 212 to 217 values, and the $32^{nd}$ section may represent the maximum value 218. In this example, the first section (1*step) may be represented as "index 0," second section (2*step) may be represented as "index 1," the third section may be "index 2," the fourth section (3*step) may be "index 3," the last section, that is, the maximum value may be represented as a binary form representing "index 31." In this example, the processor 120 may quantize each non-zero data value into an index value corresponding to the closest section among the 32 sections. For example, if the non-zero value is 214, the corresponding non-zero value may be represented by "index 31."

Table 3 below is a table representing quantized index value in the second lossy coding mode according to an embodiment.

TABLE 3

| Index 0 | Index 1 | Index 2 | Index 3 | ... | Index 30 | Index 31 |
|---|---|---|---|---|---|---|
| 1*step + Bias | 2*step + Bias | 3*step + Bias | 4*step + Bias | ... | 31*step + Bias | max |

The index n may represent that the non-zero data value belongs to the n+1 section to which the bias value is applied. For example, each step in Table 3 may be represented as the equation such as step=(MAX−Bias)/power(2, index_bits).

As illustrated in (d) of FIG. 10, there may be compressed data generated according to a third lossy coding mode, and the compressed data generated according to the third lossy coding mode may include a maximum value among the non-zero data values and quantized index information of each of the non-zero data values included in the operation data. For example, the processor 120 may compress the operation data according to the third lossy coding mode if the number of non-zero data values included in the operation data is greater than or equal to the second threshold number. In this example, the processor 120 may generate quantization index information for each of the zero data value and the non-zero data value without separately generating the non-zero data value location information. This is the case where the number of non-zero data values is more than the second threshold number and thus, it is not that meaningful to generate the position information of the non-zero data value by using 16 bits. For example, if the sub-coding block, which is the basic compression unit, is 8-bit data and the number of data in the coding block of the operation data (including the zero value) is 16, the maximum value of the non-zero data value may be represented using 8 bits, and the quantized index value of each of the zero value and the non-zero data value may be represented using 5 bits, respectively. For example, the section between the minimum value and the maximum value may be divided into 32 sections using 5 bits for each of the zero data value and the non-zero data value, and the section information to which the non-zero data value belongs, among the 32 sections, may be represented as 5-bit information.

For example, if the maximum value among the non-zero data values is 211, the value of 0 to 211 may be divided into 32 sections, and a quantized index value for each section may be generated. For example, a zero value may be divided into one section, the first section may include 1 to 7 values, the second section may include 8 to 14 values, the $30^{th}$ section may include 206 to 210 values, and the last section may represent a maximum value 211.

In this example, using 5 bit, the zero value may be represented as "index 0," the first section (1*step) may be represented as "index 1," second section (2*step) may be represented as "index 2," the third section (3*step) may be represented as "index d," the 30th section (30*step) may be represented as "index 30," and the maximum value may be represented as a binary form representing "index 31." In this example, the processor 120 may quantize each non-zero data value into an index value corresponding to the closest section among the 32 sections. For example, if the non-zero value is 209, the corresponding non-zero data value may be represented by "index 31."

Table 4 below illustrates the quantized index value in the third lossy coding mode according to an embodiment.

TABLE 4

| Index 0 | Index 1 | Index 2 | Index 3 | ... | Index 30 | Index 31 |
|---|---|---|---|---|---|---|
| 0 | 1*step | 2*step | 3*step | ... | 30*step | max |

Herein, the index n may represent that the non-zero data value belongs to the n+1 section to which the bias value is applied.

According to one embodiment, the processor 120 may perform compression on the maximum and minimum values among the non-zero data values. For example, the processor 120 may compress an 8 bit value to 2 bits as shown in Table 5 and Table 6. The values shown in Table 5 and Table 6 are merely exemplary, and various bit values may be compressed using various smaller bit values.

TABLE 5

| Maximum value | Compressed value | Restored value |
|---|---|---|
| 0~31 | 0 | 31 |
| 32~63 | 1 | 63 |

TABLE 5-continued

| Maximum value | Compressed value | Restored value |
|---|---|---|
| 64~127 | 2 | 127 |
| 128~255 | 3 | 255 |

TABLE 6

| Minimum value | Compressed value | Restored value |
|---|---|---|
| 16~31 | 0 | 16 |
| 32~63 | 1 | 32 |
| 64~127 | 2 | 64 |
| 128~255 | 3 | 128 |

The numbers in Table 1 to Table 6 are merely exemplary, and the numbers are not limited to those specifically identified.

According to an embodiment, the processor 120 may dynamically vary the bit numbers allocated for compression of each of the sub-coding blocks.

The processor 120 may vary a size of a bit (hereinafter, referred to as an index bit) to represent a quantized index bit allocated for each of the channel-specific data included in the sub-coding block. In general, when a fixed-point type is represented, a bit, that is, a memory capacity, allocated to each integer part and a fractional part is fixed because a point position is fixed. However, according to an embodiment of the disclosure, the size of a bit allocated to at least one of an integer part and a fractional part may be varied.

According to an example, the processor 120 may dynamically vary the number of bits allocated for quantization of each integer part and fractional part based on the length of at least one of an integer part or a fractional part in data converted to the fixed-point type as shown in FIG. 4. Specifically, the processor 120 may dynamically vary the number of bits allocated to each channel data based on a maximum integer length of each channel data.

For example, in the embodiment shown in FIG. 4, if an upper side (more significant bits) represents the maximum value of the first channel data and a lower side (less significant bits) represents the maximum value of the second channel data, the processor 130 may allocate more bits to the first channel data than the second channel data. This is because the length of the integer part more greatly affects the compression result. In this case, the processor 130 may quantize the inte-ger part using more bits than the second channel data for the first channel data. The processor 120 may allocate the same number of bits to the first and second channel data for the fractional part, and it is also possible to vary the number of bits allocated to the fractional part based on the number of bits allocated to the integer part. Thus, the processor 120 may minimize an error due to quantization by quantizing the value of the part having a large influence on the result using a large bit.

Figure 11:
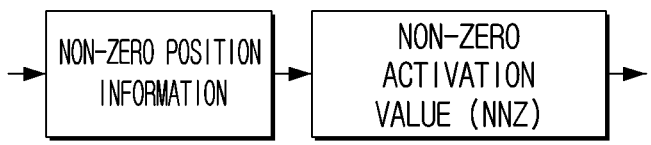
FIG. 11 is a diagram illustrating an example of dividing a coding block in a basic compression unit according to an embodiment.
Figure 11:
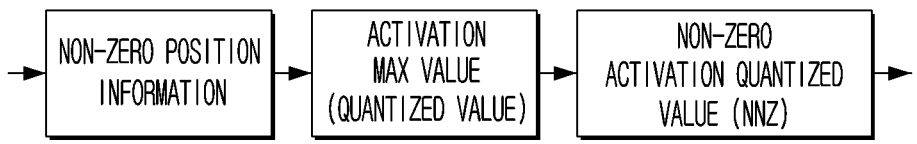
Figure 11:
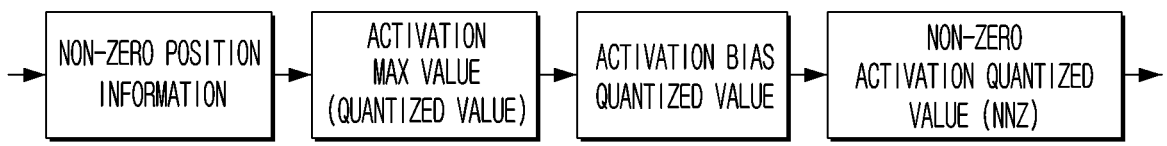
Figure 11:
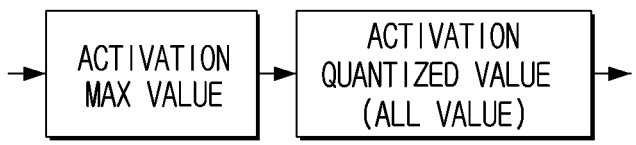

FIG. 11 is a diagram illustrating an example of dividing a coding block in a basic compression unit according to an embodiment.

As illustrated in (a), (b), (c), and (d) of FIG. 11, the size (BLK_W*BLK_C) of each coding block CB is 8×8, and the size of the BLK_C in each coding block CB, that is, the basic compression unit with the maximum lossless compression ratio, is identified while reducing the size of the channel direction data. In FIG. 10, for convenience, it is described that the coding mode is identified according to the criteria shown in Table 1, but the criterion for identifying the coding mode is not limited thereto.

In (a) of FIG. 11, the basic compression unit of the coding block is identified as 8*1(BLK_W*PART_C), and the coding mode is identified based on the number of non-zero for each of the 8*1 basic compression unit. That is, the configuration in which the coding mode is identified in units of 8×1 size may be the configuration in which the lossless compression ratio for the coding block may be the largest.

In (b) of FIG. 11, the coding mode is identified based on the number of non-zero data values for each of the 8×2 basic compression units, in the configuration that the basic compression unit of the coding block is determined to be 8*2 (BLK_W*PART_C). That is, the configuration in which the coding mode is identified in units of 8×2 size may be the configuration in which the lossless compression ratio for the coding block may be the largest.

In (c) of FIG. 11, the coding mode is identified based on the number of non-zero data values for each of the 8×4 basic compression units, in the configuration in which the basic compression unit of the coding block is determined to be 8*4 (BLK_W*PART_C). That is, the configuration in which the coding mode is identified in units of 8×4 size may be the configuration in which the lossless compression ratio for the coding block may be the largest.

In (d) of FIG. 11, the coding mode is identified based on the number of non-zero data values for each of the 8×8 basic compression units, in the configuration in which the basic compression unit of the coding block is determined to be 8*8 (BLK_W*PART_C). That is, the configuration in which the coding mode is identified in units of 8×8 size may be the configuration in which the lossless compression ratio for the coding block may be the largest.

Figure 12:
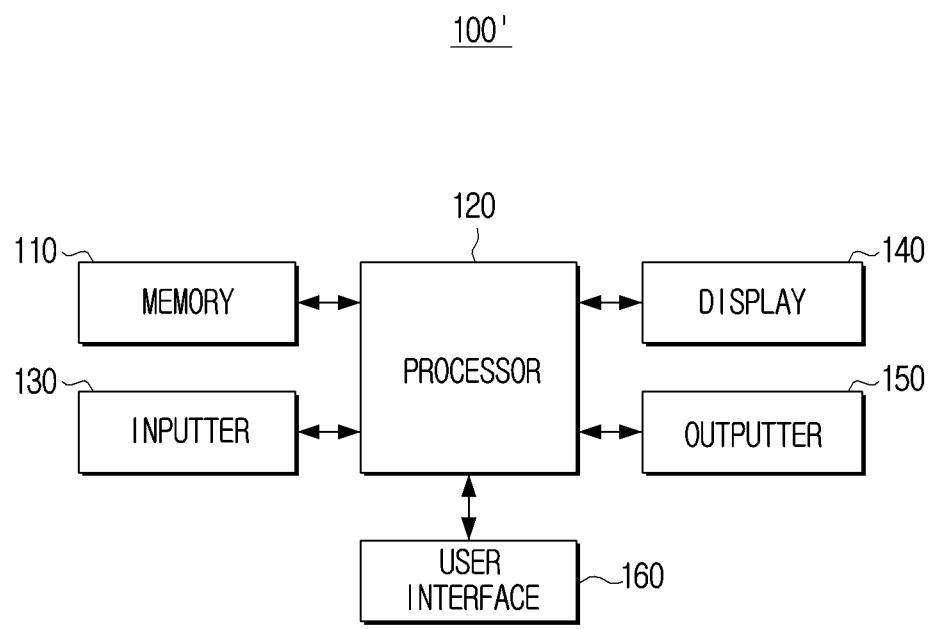
FIG. 12 is a diagram illustrating an implementation example of an electronic apparatus according to an embodiment.

FIG. 12 is a diagram illustrating an implementation example of an electronic apparatus according to an embodiment.

Referring to FIG. 12, an electronic apparatus 100' includes the memory 110, the processor 120, an inputter 130, a display 140, an outputter 150, and a user interface 160. Redundant descriptions of the components of FIG. 10 overlapping with the configuration of FIG. 2 will not be repeated.

The processor 120 may optionally perform additional pre-processing prior to the interpolation process of the input image. According to one example, the processor 120 may further perform pre-filtering to remove noise in the input image. For example, a smoothing filter such as a Gaussian filter, a guided filter for filtering the input image in comparison with a predetermined guidance, or the like, may be applied to remove noticeable noise.

For example, the inputter 130 may be configured as a communication interface to receive an image signal by streaming or downloading from an external device (for example, a source device), an external storage medium (for example, a universal serial bus (USB) device), an external server (for example, a web server, etc.) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. The image signal may be a digital image signal of any one of SD, HD, full HD, ultra HD, but the image signal is not limited thereto.

The display 140 may be implemented as a display including a self-emitting element or a display including a non-self-limiting element and a backlight. For example, the display 140 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 140, a backlight unit, a driving circuit which may be implemented as an a-si TFT, low temperature poly silicon (LTPS) TFT, organic TFT (OTFT), or the like, may be included as well. The display 140 may be implemented as a touch screen coupled to a touch sensor, a flexible display, a rollable display, a third-dimensional (3D) display, a display in which a plurality of display modules are physically connected, or the like. The processor 120 may control the display 140 to output an output image that is obtained according to various embodiments described above, such as the output image provided as a result of AI image processing. Here, the output image may be a high-resolution image of 4K, 8K or more.

The outputter 150 may be an output interface implemented to include various output circuitry and provides a sound signal. For example, the outputter 150 may convert the digital sound signal processed by the processor 120 into an analog sound signal, amplify and output the analog sound signal. For example, the outputter 150 may include various output circuitry, such as, for example, and without limitation, at least one speaker unit, a D/A converter, an audio amplifier, or the like, capable of outputting at least one channel. According to an example, the outputter 150 may be implemented to output various multi-channel sound signals. The processor 120 may control the outputter 150 to process the input sound signal in accordance with the enhanced processing of the input image. For example, the processor 120 may convert an input two-channel sound signal into a virtual multi-channel (for example, 5.1 channel) sound signal, recognize a position where the receiving apparatus 100' is located to process the signal as a cubic sound signal optimized to a space, or provide an optimized sound signal according to the type of input image (for example, a content genre).

The user interface 160 may include various user interface circuitry and may be implemented as a device such as, for example, and without limitation, a button, a touch pad, a mouse, and a keyboard, a touch screen, a remote control transceiver capable of performing the above-described display function and operation input function, or the like. The remote control transceiver may receive a remote control signal from an external remote controller through at least one communication methods such as an infrared rays communication, Bluetooth communication, or Wi-Fi communication, or transmit the remote control signal.

The electronic apparatus 100' may further include a tuner and a demodulator according to an embodiment. A tuner may receive a radio frequency (RF) broadcast signal by tuning a channel selected by a user or all pre-stored channels among RF broadcast signals received through an antenna. The demodulator may receive and demodulate the digital intermediate frequency (IF) signal and digital IF (DIF) signal converted by the tuner, and perform channel decoding, or the like. The input image received via the tuner according to an example embodiment may be processed via the demodulator and then provided to the processor 120 for image processing according to an example embodiment.

Figure 13:
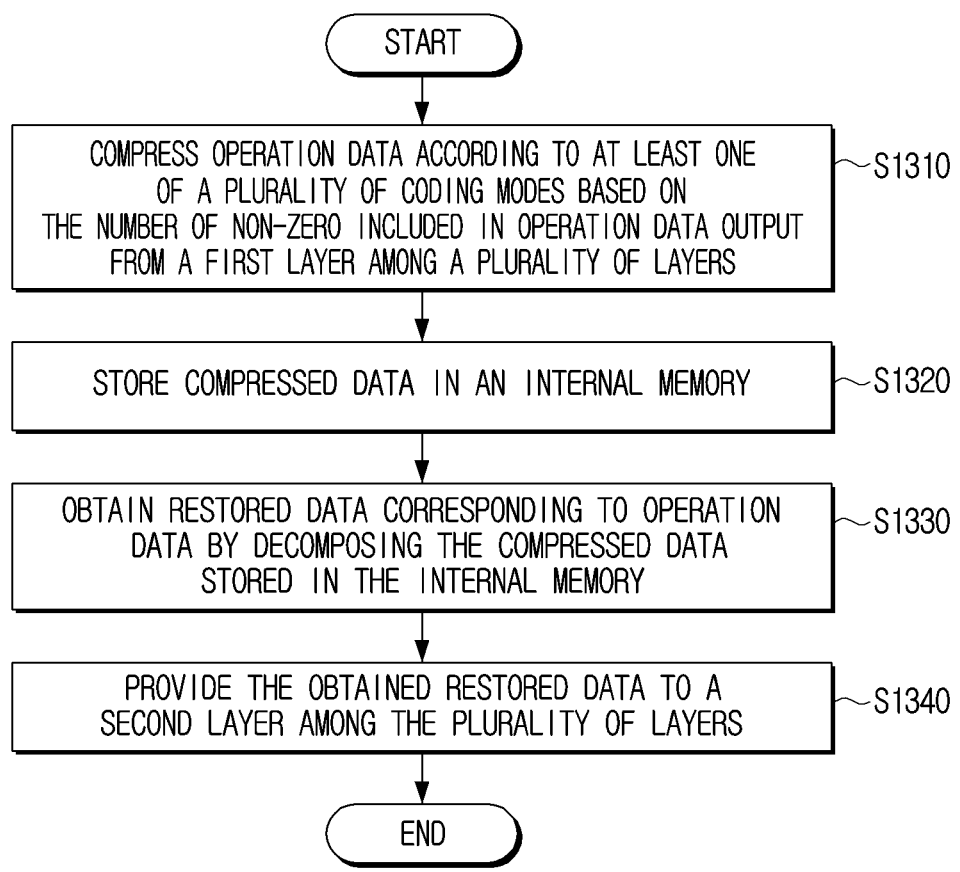
FIG. 13 is a flowchart illustrating a method for controlling an electronic apparatus according to an embodiment.

FIG. 13 is a flowchart illustrating a method for controlling an electronic apparatus according to an embodiment.

According to a method for controlling an electronic apparatus for storing information on an AI model including a plurality of layers shown in FIG. 13, the processor 120 compresses the operation data according to at least one of a plurality of coding modes based on the number of non-zero included in the operation data outputted from the first layer of the plurality of layers in operation S1310.

The compressed data is stored in an internal memory in operation S1320.

The compressed data stored in the internal memory is decompressed to obtain restoration data corresponding to the operation data in operation S1330.

The obtained restoration data is provided to the second layer among the plurality of layers in operation S1340.

Here, the plurality of coding modes may include at least one of a lossless coding mode or a lossy coding mode. In operation S1310, if the number of non-zero data values included in the operation data is less than the threshold number, the operation data is compressed according to the lossless coding mode. If the number of non-zero data values included in the operation data is greater than or equal to the threshold number, the operation data may be compressed according to the lossy coding mode. Further, the data compressed according to the lossless coding mode may include a non-zero data value, and the data compressed according to the lossy coding mode may include a quantized value of non-zero.

The lossy coding mode may also include at least one of a first lossy coding mode, a second lossy coding mode, or a third lossy coding mode. In this case, the data compressed according to the first lossy coding mode may include a non-zero value position information, a maximum value among the non-zero data values, and a non-zero data value quantization value. The data compressed according to the second lossy coding mode may include a non-zero value of position information, a maximum value of a non-zero data value, a bias value of a non-zero data value, and a quantized value of a non-zero data value. The data compressed according to the third lossy coding mode may include a maximum value of a non-zero value and a quantized value of a non-zero value.

In addition, in operation S1310, the coding block of the operation data may be divided into a plurality of sub-coding blocks, the size of the compression basic unit may be identified based on the number of non-zero data values included in each of the plurality of sub-coding blocks, and the compression may be performed according to one of the coding modes in the identified compression basic unit.

In addition, in operation S1310, the ratio that the lossless compression is applied to the operation data may be calculated based on the coding mode of each of the plurality of sub-coding blocks identified according to the number of non-zero data values included in each of the plurality of sub-coding blocks, and the size of the sub-coding block in which the calculated ratio reaches the maximum may be identified as the size of the compression basic unit.

In operation S1310, the bit number for compression of the operation data may vary based on the size of the maximum value among the non-zero data values included in the operation data.

In addition, in operation S1310, the float type operation data may be converted into a fixed-point type, and the number of bits allocated for quantization of each of the integer part and the fractional part may be dynamically varied based on the length of at least one of an integer part or a fractional part of the converted operation data.

In operation S1310, the number of bits allocated for compression of each channel data may dynamically vary based on the maximum length of integer of the non-zero data values included in each channel data of the converted operation data.

According to the various embodiments described above, by efficiently compressing operation data with small hardware resources in a real-time neural network system, the transmission bandwidth for the reading and writing of operation data may be effectively reduced.

The feature map data may be stored in an internal memory as opposed to an external memory and the transmission bandwidth to read and write the feature map data in the external memory may be reduced.

According to the various embodiments described above, by efficiently compressing operation data with small hardware resources in a real-time neural network system, the transmission bandwidth for the reading and writing of operation data may be effectively reduced.

By comparing the feature map data (that is, the feature map data output from a layer) prior to being stored in the internal memory (for example, a line buffer) and the stored feature map data, that is the pre-compression and post-compression feature map data, with respect to an image of a specific pattern, if a specific pattern is detected, it may be identified that the embodiment according to the disclosure is applied. If a specific pattern, for example, a lossless pattern or a lossy pattern, according to the number of non-zero is present by comparing the pre-compression and post-compression feature map data, it may be identified that the embodiment according to the disclosure is applied. By comparing the feature map data (that is, the feature map data output from a layer) prior to being stored in the internal memory (for example, a line buffer) and the stored feature map data, that is the pre-compression and post-compression feature map data, with respect to the fixed-point data, if a difference between the pre-compression and post-compression feature map data varies for each layer, it may be identified that the embodiment according to the disclosure is applied. Specifically, if the difference between the feature map data is varied according to the size of an integer part or a fractional part of the fixed-point data by comparing pre-compression/post-compression feature map data for each layer, it is identified that an embodiment according to the disclosure is applied.

Various embodiments can be applied to all electronic apparatuses capable of image processing, such as a display device, as well as an image receiving device, an image processing device such as a set-top box. In addition, the various embodiments described above may be performed through an embedded server provided in an electronic apparatus, or an external server of an image processing device.

The methods according to various embodiments may be implemented as a format of software or application installable to a related art electronic apparatus.

The methods according to various embodiments may be implemented by software upgrade of a related art electronic apparatus, or hardware upgrade only.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic apparatus comprising:
a memory storing information on an artificial intelligence (AI) model comprising a plurality of layers; and
a processor configured to:
obtain an output image that is output from the artificial intelligence (AI) model processing an input image,
compress operation data according to at least one of a plurality of coding modes based on a number of non-zero data values included in the operation data output from a first layer among the plurality of layers to obtain compressed operation data, and store the compressed operation data in an internal memory, obtain restoration data corresponding to the operation data by decompressing the compressed operation data stored in the internal memory, and provide the restoration data to a second layer among the plurality of layers, wherein the plurality of coding modes comprise at least one of a lossless coding mode or a lossy coding mode, wherein the processor is further configured to:

based on the number of non-zero data values included in the operation data being less than a threshold value, compress the operation data according to the lossless coding mode, based on the number of non-zero data values included in the operation data being greater than or equal to the threshold value, compress the operation data according to the lossy coding mode, wherein data compressed according to the lossless coding mode comprises the non-zero data values, and wherein data compressed according to the lossy coding mode comprises a quantized value of the non-zero data values.

2. The electronic apparatus of claim 1, wherein:

the lossy coding mode comprises at least one of a first lossy coding mode, a second lossy coding mode, or a third lossy coding mode, data compressed according to the first lossy coding mode comprises information on a position of a non-zero data value, a maximum value among the non-zero data values, and a quantized value of the non-zero data value, data compressed according to the second lossy coding mode comprises information on a position of the non-zero data value, a maximum value among the non-zero data values, a bias value of the non-zero data value, and a quantized value of the non-zero data value, and data compressed according to the third lossy coding mode comprises a maximum value among the non-zero data values and a quantized value of the non-zero data value.

3. The electronic apparatus of claim 1, wherein the processor is further configured to:

divide a coding block of the operation data into a plurality of sub-coding blocks, identify a basic unit of compression based on the number of non-zero data values included in each sub-coding block of the plurality of sub-coding blocks, and perform compression according to one of the plurality of coding modes in the basic unit of compression.

4. The electronic apparatus of claim 3, wherein the processor is further configured to:

calculate a ratio of applying lossless compression to the operation data based on coding modes of each sub-coding block of the plurality of sub-coding blocks identified according to the number of non-zero data values included in each sub-block of the plurality of sub-coding blocks, and identify a size of sub-coding blocks in which the ratio reaches maximum as a size of the basic unit of compression.

5. The electronic apparatus of claim 3, wherein the processor is further configured to compress the operation data based on an allowable data size identified based on a size of the internal memory.

6. The electronic apparatus of claim 1, wherein the processor is further configured to vary a number of bits to compress the operation data based on a size of a maximum value among the non-zero data values included in the operation data.

7. The electronic apparatus of claim 1, wherein the processor is further configured to convert a float type operation data to a fixed-point type to obtain converted operation data, and, based on a length of at least one of an integer part of the converted operation data or a fractional part of the converted operation data, dynamically vary a number of bits allocated for quantization of each of the integer part of the converted operation data or the fractional part of the converted operation data.

8. The electronic apparatus of claim 7, wherein the processor is further configured to dynamically vary a number of bits allocated for compression of each of channel data based on a maximum integer length of a non-zero data value included in each channel data of the converted operation data.

9. The electronic apparatus of claim 1, wherein the internal memory is a two-dimensional line buffer provided for each of the plurality of layers.

10. The electronic apparatus of claim 1, further comprising:

a display, wherein the processor is further configured to control the display to output the output image, and wherein the output image is a high-resolution image of 4K, 8K, or greater resolution.

11. A method of controlling an electronic apparatus storing information on an artificial intelligence (AI) model including a plurality of layers, the method comprising:

compressing operation data according to at least one of a plurality of coding modes based on the number of non-zero data values included in the operation data output from a first layer among the plurality of layers to obtain compressed operation data;

storing the compressed operation data in an internal memory;

obtaining restoration data corresponding to the operation data by decompressing the compressed operation data stored in the internal memory; and provide the restoration data to a second layer among the plurality of layers, wherein the plurality of coding modes comprise at least one of a lossless coding mode or a lossy coding mode, wherein the processor is further configured to:

based on the number of non-zero data values included in the operation data being less than a threshold value, compress the operation data according to the lossless coding mode, based on the number of non-zero data values included in the operation data being greater than or equal to the threshold value, compress the operation data according to the lossy coding mode, wherein data compressed according to the lossless coding mode comprises the non-zero data values, and wherein data compressed according to the lossy coding mode comprises a quantized value of the non-zero data values.

12. The method of claim 11, wherein:

the lossy coding mode comprises at least one of a first lossy coding mode, a second lossy coding mode, or a third lossy coding mode, data compressed according to the first lossy coding mode comprises information on a position of a non-zero data value, a maximum value among the non-zero data values, and a quantized value of the non-zero data value, data compressed according to the second lossy coding mode comprises information on a position of the non-zero data value, a maximum value among the non-zero data values, a bias value of the non-zero data value, and a quantized value of the non-zero data value, and the data compressed according to the third lossy coding mode comprises a maximum value among the non-zero data values and a quantized value of the non-zero data value.

13. The method of claim 11, wherein the compressing comprises:
dividing a coding block of the operation data into a plurality of sub-coding blocks;
identifying a size of a basic unit of compression based on the number of non-zero data values included in each sub-coding block of the plurality of sub-coding blocks; and
performing compression according to one of the plurality of coding modes in the basic unit of compression.

14. The method of claim 13, wherein the compressing comprises:
calculating a ratio of applying lossless compression to the operation data based on coding modes of each sub-coding block of the plurality of sub-coding blocks identified according to the number of non-zero data values included in each sub-block of the plurality of sub-coding blocks, and
identifying a size of sub-coding blocks in which the ratio reaches maximum as a size of the basic unit of compression.

15. The method of claim 11, wherein the compressing comprises varying a number of bits to compress the operation data based on a size of a maximum value among the non-zero data values included in the operation data.

16. The method of claim 11, wherein the compressing comprises:
converting a float type operation data to a fixed-point type to obtain converted operation data; and
based on a length of at least one of an integer part of the converted operation data or a fractional part of the converted operation data, dynamically varying a number of bits allocated for quantization of the integer part of the converted operation data or the fractional part of the converted operation data.

17. The method of claim 16, wherein the compressing comprises dynamically varying a number of bits allocated for compression of each of channel data based on a maximum integer length of a non-zero data value included in each channel data of the converted operation data.

18. A non-transitory computer readable medium storing computer instructions executed by a processor of an electronic apparatus storing information on an artificial intelligence model comprising a plurality of layers to cause the electronic apparatus perform operations including:
compressing operation data according to at least one of a plurality of coding modes based on a number of non-zero data values included in the operation data output from a first layer among the plurality of layers to obtain compressed operation data;
storing the compressed operation data in an internal memory;
obtaining restoration data corresponding to the operation data by decompressing the compressed operation data stored in the internal memory; and
provide the restoration data to a second layer among the plurality of layers,
wherein the plurality of coding modes comprise at least one of a lossless coding mode or a lossy coding mode,
wherein the processor is further configured to:
based on the number of non-zero data values included in the operation data being less than a threshold value, compress the operation data according to the lossless coding mode,
based on the number of non-zero data values included in the operation data being greater than or equal to the threshold value, compress the operation data according to the lossy coding mode,
wherein data compressed according to the lossless coding mode comprises the non-zero data values, and
wherein data compressed according to the lossy coding mode comprises a quantized value of the non-zero data values.

* * * * *